UNITED STATES PATENT OFFICE.

WALTER L. JORDAN, OF GLENDALE, CALIFORNIA, ASSIGNOR TO CELITE PRODUCTS COMPANY, OF LOS ANGELES, CALIFORNIA, A CORPORATION OF CALIFORNIA.

PROCESS OF RECLAIMING USED LUBRICATING-OILS.

1,393,223. Specification of Letters Patent. Patented Oct. 11, 1921.

No Drawing. Application filed November 21, 1916. Serial No. 132,621.

*To all whom it may concern:*

Be it known that I, WALTER L. JORDAN, a citizen of the United States, residing at Glendale, in the county of Los Angeles and State of California, have invented a new and useful Process of Reclaiming Used Lubricating-Oils, of which the following is a specification.

This invention relates to a process for treating used lubricating oils to render them fit for reuse in lubrication. Lubricating oil which has been used for lubricating machinery, and particularly where it has been subjected to high temperature and severe wearing conditions, as for example in internal combustion engines, such as Diesel engines, becomes so fouled with suspended particles of carbon and metal, largely in a colloidal condition, that it is unfit for reuse, and is difficult to purify, the suspended impurities being hard to remove on account of their colloidal condition and of the viscosity of the oil. The usual method of reclaiming such used oils has been by adding coagulants, and allowing the same to settle out, so as to carry down more or less of the carbon and metallic impurities. Or, in some cases, after adding the coagulants, and allowing sufficient time for coagulation to take place, the oil has been passed through a gravity type of filter. Both of these methods are unsatisfactory by reason of the time required for the operation thereof, and by reason of the imperfect clearing of the oil effected thereby.

The main object of the present invention is to provide for reclaiming or recovering the oil from used or waste oil by a rapid and effective operation, in such manner as to produce a reclaimed oil which is as clear as the original oil and at comparatively small expense.

My invention consists essentially in adding a suitable amount of kieselguhr (diatomaceous or infusorial earth) to the used oil, heating and agitating thoroughly so as to get uniform suspension of the kieselguhr in the oil, and passing the mixture through a pressure filter under proper conditions of heat and pressure to provide for rapid and clean filtration.

The amount of kieselguhr used will depend on the kind of oil and the amount of impurity therein, and can be determined in such cases by trial. Similarly the amount of heat used and the time of heating and agitating will be determined in each case by test. The kieselguhr used may be ordinary air dried kieselguhr, reduced to a fine state of division, say 100 mesh and finer.

The very first portion of oil passing through and issuing from the filter press will be turbid, but as soon as a small quantity of oil has passed through the filter, a thin film of kieselguhr will have been built up on the cloth or other supporting medium of the filter. As soon as such a film has been built up, the oil coming from the filter will be perfectly clear and bright. High pressure may be used to give rapid filtration without injuring the quality of the filtrate.

I have found that lubricating oils, such as petroleum oils which have been rendered very dark and entirely unfit for further use, by reason of solid impurities taken up by them in being used as lubricants, may be reclaimed by the above described process and converted into clean transparent oils in which it is impossible to detect any haze or cloudiness by the naked eye.

What I claim is:

1. The process of reclaiming used lubricating oils which consists in mixing finely divided kieselguhr therewith and subjecting the mixture to filtration under pressure.

2. The process of reclaiming used lubricating oils which consists in mixing finely divided kieselguhr therewith, heating and agitating and then filtering the mixture under pressure.

3. The process of reclaiming used lubricating oils which consists in mixing finely divided kieselguhr therewith, heating the mixture and filtering the heated mixture under pressure.

In testimony whereof I have hereunto set my hand, at Los Angeles, California, this 13th day of November, 1916.

WALTER L. JORDAN.